Dec. 14, 1937.    C. R. STOUGH    2,101,923
VEHICLE WHEEL
Filed July 13, 1935
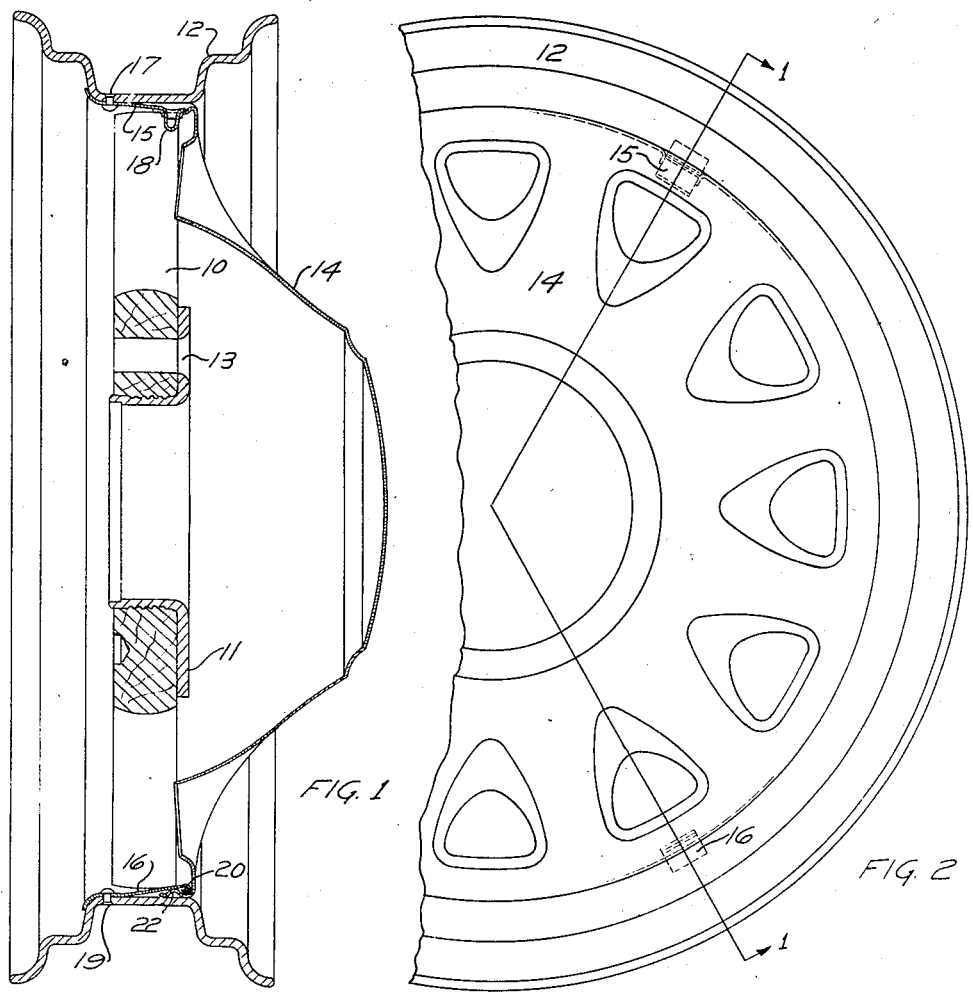
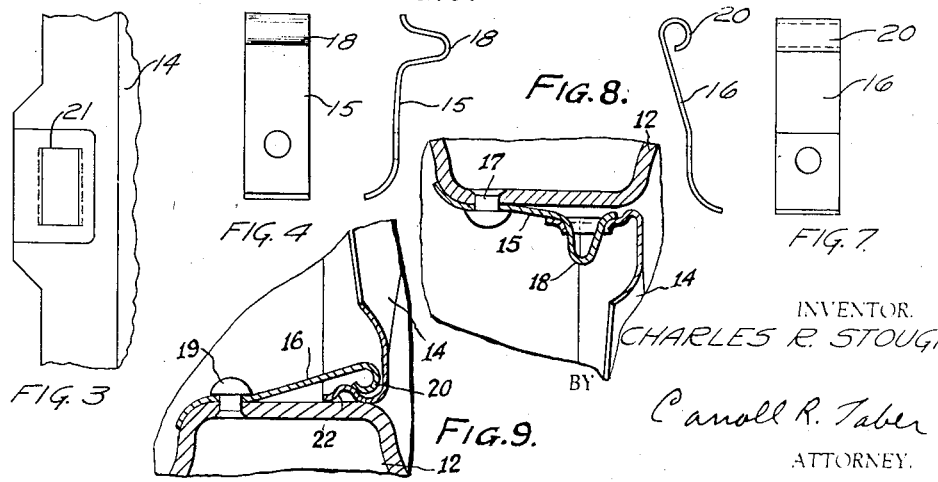
INVENTOR.
CHARLES R. STOUGH
BY Carroll R. Taber
ATTORNEY.

Patented Dec. 14, 1937

2,101,923

UNITED STATES PATENT OFFICE 2,101,923

VEHICLE WHEEL

Charles R. Stough, Lansing, Mich., assignor to Motor Wheel Corporation, Lansing, Mich., a corporation of Michigan Application July 13, 1935, Serial No. 31,148

8 Claims. (Cl. 301—37)

This invention relates to vehicle wheels and more particularly to the combination with a vehicle wheel of an ornamental cover therefor and novel means for attaching the cover to the wheel. Broadly stated, the present invention consists in the provision of means for hooking one portion of a cover to a corresponding portion of the wheel, and thereafter latching a remote portion of the cover to the adjacent portion of the wheel.

An illustrative embodiment of the invention is shown in the attached drawing wherein:

Figure 1 is a partial sectional view of a vehicle wheel and ornamental cover therefor taken on substantially the line 1—1 of Figure 2;

Figure 2 is a partial front view in elevation of the structure shown in Figure 1;

Figure 3 is an enlarged fragmentary view of a portion of the cover illustrated in Figures 1 and 2;

Figure 4 is a plan view of one of the attaching clips illustrated in Figure 1;

Figure 5 is a side view of the clip shown in Figure 4;

Figure 6 is a side view of the other attaching clip shown in Figure 1; and

Figure 7 is a plan view of the clip shown in Figure 6.

Figure 8 is a cross-sectional view on an enlarged scale of a portion of the rim and cover plate and the securing clip shown in the upper part of Figure 1;

Figure 9 is a cross-sectional view on an enlarged scale of the rim, cover plate and securing clip shown in the lower end of Figure 1.

The wheel shown in Figure 1 is of the wood spoke type including the spokes 10 mounted upon a central flange 11 and having secured to their outer extremities a conventional rim 12. As shown, the radial portion of flange 11 is provided with a plurality of bolt openings 13 by means of which the wheel is attached to a conventional hub. Certain of the spokes 10 are provided with openings in alignment with the openings 13.

The rim 12 is provided with means for detachably connecting a cover 14 thereto. The attaching means consists of what may be termed a hooking element 15 and one or more latching elements 16. The hooking element here shown is in the form of a resilient clip (see Figures 4 and 5) attached to the radially inner surface of the rim 12 by a rivet 17. The resilient clip 15 is provided adjacent its outer extremity with a radially extending projection 18 adapted to engage a corresponding opening in the periphery of the cover, as will be described presently. Clip 15 is preferably attached to rim 12 so that its outer extremity is spaced a slight distance from the inner surface of the rim.

The latching element 16, as here shown, is also in the form of a resilient clip (see Figures 6 and 7). One or more of these clips may be used. Where one is used it will be secured to the rim at a point diametrically opposite from the hooking element 15. Where more than one are used they will be secured to the rim in regions remote from the hooking element 15. Figure 2 illustrates an arrangement where two of the latching elements 16 are used indicating the location of one of the two elements 16.

The element 16 is attached to the inner surface of rim 12 by rivets 19. Unlike the hooking element 15 the attaching element 16 is secured to the rim 12 whereby its outer enlarged extremity 20 normally contacts the inner surface of the rim. This extremity 20, as will now be described, is adapted to engage a cooperating projection on the cover when the cover is installed upon the wheel.

The cover 14 is provided with a peripheral flange of slightly less diameter than the internal diameter of rim 12. This flange is provided with an opening 21 (see Figure 3) adapted to receive projection 18 of hooking element 15. Preferably throughout the remainder of its circumferential extent this flange is provided with a radially inwardly extending groove or depression 22 adapted to be pressed into interlocking engagement with the enlarged extremity 20 of latching element 16.

The cover 14 is mounted upon the wheel by first inserting projection 18 into opening 21 of the cover. The cover is then swung about the hooking element 15 as a pivot toward the wheel whereby depressions 22 are pressed into engagement with the outer extremity of latching element 16. Hooking element 15 is preferably of such resiliency as to press the cover toward the rim at the opposite side of the wheel from the hooking device. The outer extremity of latching element 16 is also resilient to permit the deflection thereof sufficiently to enable depression 22 to pass between enlarged portion 20 and the inner surface of rim 12. After the cover is installed, as shown in Figure 1, the resiliency of the hooking element 15 and latching element 16 firmly hold the cover in position. The hooking element fixedly engages one portion of the cover and the latching element resiliently engages a remote portion of the cover.

While the invention has been herein shown and described as applied to a wheel of the wood spoke type, and as including a particular form of cover it should be understood that it is equally applicable to other types of wheels and other forms of covers. Likewise, the particular form and location of the hooking and latching elements may be varied within limits defined by the appended claims without departing from the spirit or scope of the present invention.

I claim:

1. The combination with a wheel and a cover therefor including an axially extending peripheral flange, of means for detachably securing the cover to the wheel comprising a pair of resilient attaching elements permanently secured to the wheel at widely spaced points adjacent the periphery of the wheel, one of said elements adapted to engage the outer surface of said flange and to exert thereagainst a yielding pressure in a radially inward direction, the other of said elements adapted to engage the inner surface of said flange and to exert a yielding pressure thereagainst in a radially outward direction.

2. The combination with a wheel and a cover therefor of means for detachably securing the cover to the wheel comprising a pair of resilient attaching elements permanently secured to the wheel at widely spaced points about its periphery, one of said elements adapted to resiliently engage a peripheral portion of the cover to urge the same away from the adjacent portion of the wheel, the other said element adapted to resiliently engage the peripheral portion of the cover to urge the same against the adjacent portion of the wheel.

3. The combination with a wheel and a cover therefor of means for detachably connecting the cover to the wheel comprising a resilient hook carried by the wheel and adapted to engage an opening provided for that purpose in the cover adjacent its periphery and a separate attaching element also carried by the wheel adapted to engage the periphery of the cover at a point remote from said opening upon the cover first being engaged by said hook and thereafter swung about the hook as a pivot toward the wheel, said hook adapted to resiliently urge the cover toward said attaching element.

4. In a wheel including an ornamental cover, means for detachably connecting the cover to the wheel comprising a resilient clip permanently secured to the wheel and adapted to engage a peripheral portion of the cover in a manner to limit the axial movement of that portion and to resiliently urge the cover against a portion of the wheel remote from the clip.

5. In a wheel including a rim and an ornamental cover having a peripheral portion of a size to permit its insertion within the rim, means for detachably connecting the cover to the rim comprising a resilient clip permanently secured to the rim and adapted to engage a peripheral portion of the cover to secure it against axial movement and to urge the cover against a portion of the rim remote from the clip.

6. In a wheel including an ornamental cover having a peripheral portion provided with an opening therein, means for detachably connecting the cover to the wheel comprising a resilient clip permanently secured to the wheel and provided with a projection adapted to be inserted in the opening of the cover in a manner to restrict the axial movement of that portion of the cover and to resiliently urge the cover against a portion of the wheel remote from the clip.

7. In a wheel, means for detachably connecting a cover thereto comprising a resilient clip having one end permanently connected to the wheel and the other end provided with a projection adapted to engage a cooperating portion of the cover, said clip arranged to exert a radially inward pressure against the cover.

8. In a wheel including a rim and an ornamental cover having a peripheral portion of a size to permit its insertion within the rim and an opening in said peripheral portion, means for detachably connecting the cover to the wheel comprising a resilient clip having one end permanently connected to the inner surface of the rim and the other end provided with a projection adapted to be inserted in the opening of the cover in a manner to restrict the axial movement of that portion of the cover and to exert a yielding pressure against the cover in a radially inward direction.

CHARLES R. STOUGH.